United States Patent
Anderson et al.

(10) Patent No.: US 8,605,850 B2
(45) Date of Patent: Dec. 10, 2013

(54) METHOD AND SYSTEM FOR PROVIDING PHASE REFERENCE SIGNAL

(75) Inventors: Keith F. Anderson, Santa Rosa, CA (US); Loren C. Betts, Rohnert Park, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 439 days.

(21) Appl. No.: 13/071,589

(22) Filed: Mar. 25, 2011

(65) Prior Publication Data

US 2012/0243595 A1    Sep. 27, 2012

(51) Int. Cl.
*H04L 7/00*    (2006.01)
*H04L 25/00*    (2006.01)
*H04L 25/40*    (2006.01)

(52) U.S. Cl.
USPC ............... 375/371; 375/226; 375/228

(58) Field of Classification Search
USPC ............... 375/226, 228, 268, 279–283, 371
See application file for complete search history.

(56) References Cited

U.S. PATENT DOCUMENTS

2004/0264977 A1 *  12/2004  Yap et al. .............. 398/161

\* cited by examiner

*Primary Examiner* — Curtis Odom

(57) ABSTRACT

A method and system of providing a phase reference signal includes generating a reference signal having a reference frequency, modulating the reference signal at a modulation frequency lower than the reference frequency to obtain a modulated drive signal, receiving the modulated drive signal at a phase reference, and generating the phase reference signal based on the modulated drive signal. The phase reference signal including multiple reference tones having corresponding tone frequencies clustered around multiples of the reference frequency. A spacing between adjacent tones of the multiple reference tones is the same as the modulation frequency or an integer multiple of the modulation frequency.

20 Claims, 7 Drawing Sheets

METHOD AND SYSTEM FOR PROVIDING PHASE REFERENCE SIGNAL

BACKGROUND

Many modern electronic devices, such as mobile wireless communication devices, include integrated circuits having various nonlinear components, such as transistors and amplifiers. For example, the trend towards increasing energy efficiency, e.g., to extend battery life of mobile wireless communication devices, requires the transistors to operate under increasing nonlinear conditions. Also, wider bandwidths of modern signal formats, such as long term evolution (LTE), WiMAX and wideband code division multiple access (WCDMA), are stimulating the transistors with complex modulation formats, including more complicated signals with higher peak-to-average ratios. Further, transistors fabricated in new semiconductor materials, such as gallium nitride (GaN), and other compound semiconductor materials, such as gallium arsenide (GaAs), may exhibit complicated nonlinear dynamical effects in response to the complex modulation signals. Consequently, test instruments, such as Nonlinear Vector Network Analyzers (NVNAs) and Large-Signal Network Analyzers (LSNAs), need the ability to accurately measure and characterize these nonlinear components and/or characteristics.

For example, when measuring intermodulation distortion (IMD) and memory effects of a device under test (DUT), such as an amplifier, an NVNA stimulates the DUT with a multi-tone stimulus signal and receives a corresponding multi-tone response signal, in which two or more tones are localized around a center frequency of the stimulus signal. If the tones in the multi-tone stimulus and response signals are too closely spaced to one another (e.g., less than 1 MHz apart), then a conventional phase reference signal, consisting of multiple reference tones at predetermined intervals, may not be able to provide enough signal power at each of the reference tones for the NVNA to obtain a good measurement. That is, in order to measure phase of the multi-tone response signal, the reference tones of the phase reference signal must be at least as closely spaced as the tones in the multi-tone response signal. However, the smaller the interval between the reference tones, the lower the power of each reference tone, until the reference tones of the phase reference signal are lost in the noise floor, resulting in noisy measurements. For this reason, conventional test instruments are not able to use multi-tone stimulus signals with very narrow spacing between the tones, e.g., less than 1 MHz, as a practical matter.

Generally, a conventional phase reference signal is generated by a phase reference signal generator, which is essentially a pulse generator clocked by a fixed reference signal. When viewed in the time domain, the phase reference signal is a pulse train. When viewed in the frequency domain, the phase reference signal is a broadband comb of reference tones, referred to as a grid, which are spaced apart at intervals equal to the reference signal. FIG. 1 is a graph showing power distribution among the reference tones of a conventional phase reference signal at different tone spacing intervals in the frequency domain. As shown in FIG. 1, grid 101 is a high frequency (1 GHz) grid, in which the spacing interval between adjacent reference tones (e.g., integer multiples of 1 GHz) is relatively large and the power is about −40 dBm. In comparison, grid 102 is a low frequency (100 MHz) grid, in which the spacing interval between adjacent reference tones (e.g., integer multiples of 100 MHz) is relatively small. The power, which is distributed over a larger number of reference tones in grid 102, is about −60 dBm. Accordingly, the power associated with each reference tone in gird 102 is about 20 dB lower than the power associated with each reference tone in gird 101, resulting in noisy measurements at the lower frequency.

SUMMARY

In a representative embodiment, a method of providing a phase reference signal includes generating a reference signal having a reference frequency, modulating the reference signal at a modulation frequency lower than the reference frequency to obtain a modulated drive signal, and receiving the modulated drive signal at a phase reference signal generator, and generating the phase reference signal based on the modulated drive signal. The phase reference signal includes multiple reference tones having corresponding tone frequencies clustered around multiples of the reference frequency. A spacing between adjacent tones of the multiple reference tones is the same as the modulation frequency or an integer multiple of the modulation frequency.

In another representative embodiment, a system for determining a nonlinear characteristic of a device under test (DUT) includes a signal generator, a phase reference signal generator and a signal analyzer. The signal generator is configured to generate a radio frequency (RF) drive signal, the RF drive signal having a carrier frequency and being modulated at a modulation frequency that is lower than the carrier frequency. The phase reference signal generator is configured to receive the modulated RF drive signal from the signal generator and to output multiple tones having corresponding tone frequencies clustered around multiples of the carrier frequency, where differences between tone frequencies of adjacent tones are the same as the modulation frequency or an integer multiple of the modulation frequency. The signal analyzer is configured to receive a response signal from the DUT in response to a stimulus signal, to calculate a phase difference between selected frequencies of the response signal using at least one tone of the multiple tones as a phase reference, and to determine the nonlinear characteristic of the DUT based on the calculated phase difference.

In another representative embodiment, a method of providing a phase reference signal includes generating a reference signal having a reference frequency, receiving the reference signal at a phase reference signal generator, generating the phase reference signal using the reference signal as a drive signal, and modulating the phase reference signal at a modulation frequency lower than the reference frequency to obtain a modulated phase reference signal. The modulated phase reference signal includes multiple reference tones having corresponding tone frequencies clustered around multiples of the reference frequency. A spacing between adjacent tones of the multiple reference tones is the same as the modulation frequency or an integer multiple of the modulation frequency.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
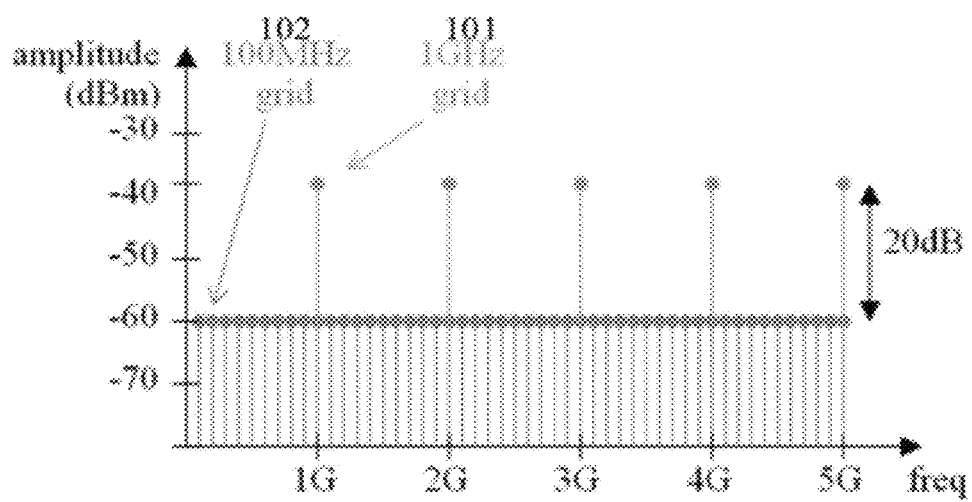
FIG. 1 is a graph showing power distribution among reference tones of phase reference signals at different tone spacing intervals in the frequency domain.

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Generally, it is understood that the drawings and the various elements depicted therein are not drawn to scale. Further, relative terms, such as "above," "below," "top," "bottom," "upper," "lower," "left," "right," "vertical" and "horizontal," are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be "below" that element. Likewise, if the device were rotated 90 degrees with respect to the view in the drawings, an element described as "vertical," for example, would now be "horizontal."

Generally, various representative embodiments provide systems and methods for providing a modulated phase reference signal, including arbitrarily closely spaced reference tones localized around a carrier frequency of the phase reference signal at higher power levels, as compared to conventional systems and methods using an unmodulated phase reference signal. The phase reference signal may be used for phase related measurements of a device under test (DUT), including measurements of nonlinear characteristics. The higher power levels of the reference tones improve measurement speed and accuracy.

Figure 2:
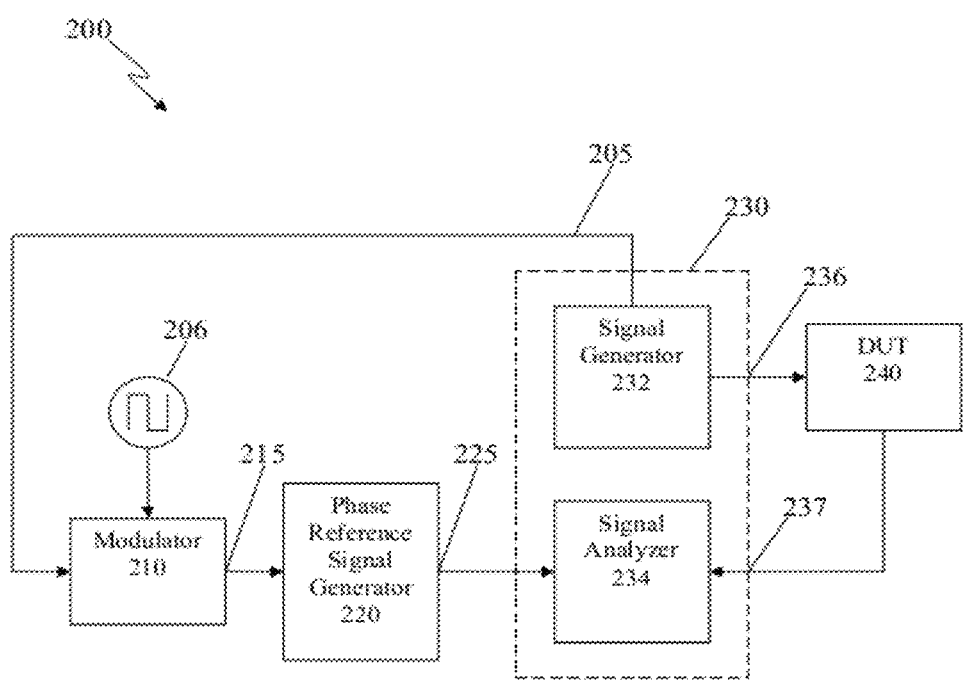
FIG. 2 is a functional block diagram illustrating a test system for determining a nonlinear characteristic of a device under test (DUT), according to a representative embodiment.

FIG. 2 is a functional block diagram illustrating a test system for determining nonlinear characteristics of a device under test (DUT), according to a representative embodiment.

Referring to FIG. 2, testing system 200 includes modulator 210, phase reference signal generator 220, signal generator 232 and signal analyzer 234. The signal generator 232 provides a stimulus signal 236 to DUT 240. The DUT 240 outputs a response signal 237, which is analyzed by the signal analyzer 234, e.g., in order to measure various nonlinear characteristics of the DUT 240. The measurements performed by the signal analyzer 234 include comparing the response signal 237 with closely spaced reference tones of a phase reference signal 225 provided by the phase reference signal generator 220, discussed below.

In an embodiment, the signal generator 232 and the signal analyzer 234 are included in a vector network analyzer 230, such as a PNA-X Series Nonlinear Vector Network Analyzer (NVNA), available from Agilent Technologies, Inc., for example, or other large-signal network analyzer. Alternatively, the signal generator 232 and the signal analyzer 234 may be separate devices. For example, the signal analyzer 234 may be implemented using an oscilloscope or a spectrum analyzer. Measuring the nonlinear characteristics of the DUT 240 may include measuring IMD, measuring memory effects, measuring harmonic distortion, identifying spurious signals and determining X-parameters of the DUT 240.

More particularly, the signal generator 232 generates a high frequency (e.g., radio frequency (RF)) reference signal 205, which has a corresponding carrier or center frequency, referred to as reference frequency $f_{ref}$. For example, in various embodiments, the reference frequency $f_{ref}$ may be at least about 100 MHz. The reference signal 205 is provided to the modulator 210, which may be a pulse modulator, for example. The modulator 210 also receives a low frequency modulation signal 206, which has a corresponding modulation frequency $f_{mod}$, and modulates the reference signal 205 at a modulation frequency $f_{mod}$ to generate modulated drive signal 215. The modulation frequency $f_{mod}$ is low relative to the reference frequency $f_{ref}$, and in various embodiments, the modulation frequency $f_{mod}$ may be less than about 10 MHz, for example. The modulated drive signal 215 has a carrier frequency equal to the reference frequency $f_{ref}$, and is output to the phase reference signal generator 220. In various alternative embodiments, the reference frequency $f_{ref}$ may be greater than about 1 GHz and the modulation frequency $f_{mod}$ may be less than about 1 MHz, for example.

The modulator 210 may have various configurations, as would be apparent to one of ordinary skill in the art. For example, the modulator 210 may include an AND gate, in which case the modulated drive signal 215 includes an amplitude modulated wave. Alternatively, the modulator 210 may include a NAND gate, in which case the modulated drive signal 215 is binary phase shift key (BPSK) modulated, as discussed below. In an embodiment, the modulation signal 206 is also generated by the signal generator 232, along with the reference signal 205. However, in alternative embodiments, one or both of the modulation signal 206 and the reference signal 205 may be provided by another signal source, without departing from the scope of the present teachings. In addition, although depicted separately, the modulator 210 and/or the phase reference signal generator 220 may be incorporated within the signal generator 232 and/or the vector network analyzer 230, without departing form the scope of the present teachings.

As stated above, the modulation frequency $f_{mod}$ of the modulation signal 206 is lower than the reference frequency $f_{ref}$ of the reference signal 205. Stated differently, a modulation component at the reference frequency $f_{ref}$ relative to the modulation frequency $f_{mod}$ is less than about 0.01 (i.e., less than about one percent). In various alternative embodiments, a modulation component at the reference frequency $f_{ref}$ relative to the modulation frequency $f_{mod}$ is less than about 0.001 (i.e., less than about one tenth of one percent).

According to various embodiments, the reference signal 205 may be amplitude modulated, frequency modulated or phase modulated by the modulation signal 206 to provide the modulated drive signal 215. For example, when the reference signal 205 is amplitude modulated, the modulation signal 206 may include a square waveform, a rectangular waveform, a pseudo random binary sequence (PRBS) waveform, or the like. As a result, the amplitude modulated drive signal 215 includes a reference signal (e.g., reference signal 205) with a square waveform modulation envelope, a rectangular waveform modulation envelope, or a PRBS waveform modulation envelope, respectively. When the reference signal 205 is frequency modulated, the resulting frequency modulated drive signal 215 may include a PRBS waveform, for example. Also, when the reference signal 205 is phase modulated, the reference signal 205 and the resulting phase modulated drive signal 215 may be BPSK modulated, for example. An advantage of a BPSK modulated drive signal 215 is that the carrier frequency (reference frequency $f_{ref}$) may be nulled out depending on the modulation frequency $f_{mod}$, which raises power at the side bands. Also, a BPSK modulated drive signal 215 is always present (i.e., it does not cycle on and off like an amplitude modulated drive signal 215), and therefore prevents adverse capacitance effects that may otherwise result.

The phase reference signal generator 220 receives the modulated drive signal 215 from the modulator 210, and outputs a modulated phase reference signal 225, consisting of multiple reference tones having corresponding tone frequencies clustered around multiples of the reference frequency $f_{ref}$. The phase reference signal generator 220 is effectively a pulse generator clocked by the modulated drive signal 215, and may be implemented, for example, using a U9391C Comb Generator or a U9391F Comb Generator, available from Agilent Technologies, Inc. The spacing interval between adjacent reference tones of the phase reference signal 225 is equal to the modulation frequency $f_{mod}$ or an integer multiple of the modulation frequency $f_{mod}$. The phase reference signal 225 is output to the signal analyzer 234, which calculates phase differences between selected frequencies of the response signal 237 using the reference tones of the phase reference signal 225, enabling determination of nonlinear characteristics of the DUT 240.

For example, the stimulus signal 236 input to the DUT 240 may be a multi-tone stimulus signal, and the response signal 237 output by the DUT 240 may be a corresponding multi-tone response signal. According to various embodiments, even when the tones in the multi-tone stimulus and response signals 236 and 237 are closely spaced to one another (e.g., less than 1 MHz), accurate phase comparisons to the phase reference signal 225 may be made. More particularly, because the phase reference signal generator 220 is driven by the modulated drive signal 215, the reference tones of the phase reference signal 225 have sufficient signal power, even when spaced apart by sufficiently narrow intervals (e.g., less than 1 MHz) to enable accurate comparisons and good measurements. Accordingly, the testing system 200 is able to incorporate use of multi-tone stimulus signals with very narrow spacing between the tones, e.g., less than 1 MHz.

Generally, the improvement in power between conventionally using the reference signal (with reference frequency $f_{mod}$) as the phase reference drive signal and using the reference signal modulated by the modulation frequency $f_{mod}$ as the phase reference drive signal, according to various embodiments, is approximately proportional to the square of the ratio of the reference frequency $f_{ref}$ to the modulation frequency $f_{mod}$. For example, a 100:1 ratio of the reference frequency $f_{ref}$ to the modulation frequency $f_{mod}$ results in about 10,000 times more output power at the reference tones of the phase reference signal 225 than conventionally generated reference tones. Also, the modulation of the reference signal 205 is spread spectrum in nature, so the ratio of the reference frequency $f_{ref}$ to the modulation frequency $f_{mod}$ should be relatively high, e.g., to minimize frequency splatter and associated errors. Although the ratio of at least about 100:1 of the reference frequency $f_{ref}$ to the modulation frequency $f_{mod}$ is generally sufficient, lower ratios may be used without departing from the scope of the present teachings.

Figure 4:
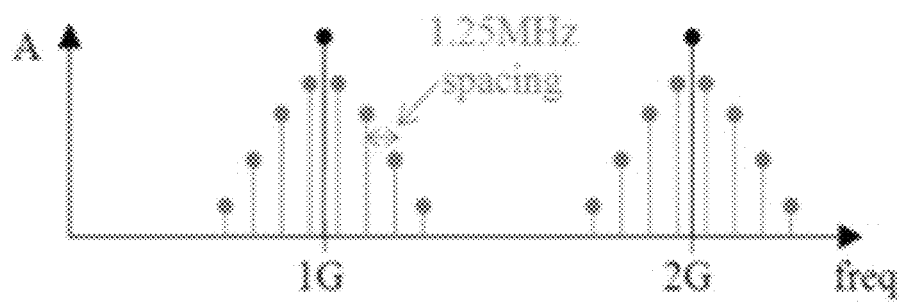
FIG. 4 is a graph showing power distribution among reference tones of an amplitude modulated phase reference signal in the frequency domain, according to a representative embodiment.

As another example, the reference frequency $f_{ref}$ of the reference signal 205 may be adjusted in the course of performing measurements of the DUT 240, which correspondingly adjusts main reference tones of the phase reference signal 225, discussed below with reference to FIG. 4. For example, a particularly dense grid may be provided by moving the main reference tones of the phase reference signal 225 in response to changes to the reference frequency $f_{ref}$. In an embodiment, a computer processor, e.g., located in the vector network analyzer 230, may be used to control adjustments of the reference frequency $f_{ref}$ in order to achieve a desired grid. When using a processor, a memory or other computer readable medium, including any number, type and combination of nonvolatile read only memory (ROM) and volatile random access memory (RAM), may be provided for storing executable software/firmware and/or executable code that allows it to perform the various functions.

Figure 3:
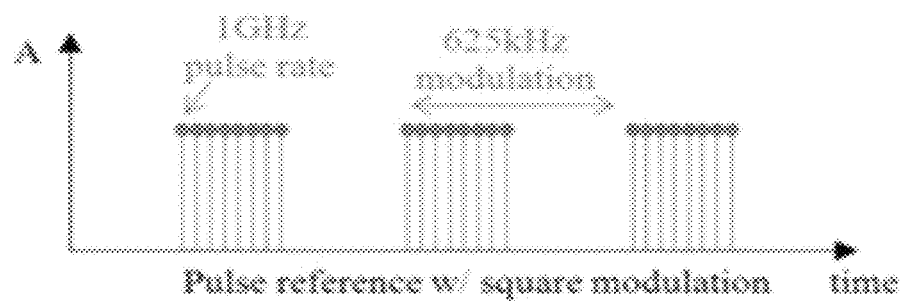
FIG. 3 is a graph showing power distribution among reference tones of an amplitude modulated phase reference signal in the time domain, according to a representative embodiment.

FIG. 3 is a graph showing power distribution among reference tones of an amplitude modulated phase reference signal in the time domain, according to a representative embodiment. FIG. 4 is a graph showing power distribution among reference tones of the same amplitude modulated phase reference signal in the frequency domain, according to a representative embodiment. In the example depicted in FIGS. 3 and 4, the reference frequency $f_{ref}$ is 1 GHz and the modulation frequency $f_{mod}$ is 625 kHz, and the drive signal is modulated by a square waveform, for purposes of illustration.

Referring to FIG. 3, the reference tones within pulses of the square waveform are spaced at intervals of 1 ns, and the pulses of the square waveform occur at the modulation frequency $f_{mod}$ of 625 kHz. Referring to FIG. 4, the reference tones are clustered around a main reference tone at the reference frequency $f_{ref}$ at 1 GHz, and around a main reference tone at an integer multiple of the reference frequency $f_{ref}$ at 2 GHz. The clustered reference tones are spaced at intervals of 1.25 MHz, which is twice the modulation frequency $f_{mod}$ of 625 kHz. This is because, for square waveform modulation, the odd harmonics are zeroed out, so it appears that the reference tones are spaced apart at intervals of twice the modulation frequency $f_{mod}$.

Thus, the high carrier frequency of modulated drive signal 215, which is equal to the reference frequency $f_{ref}$, results in high output power at harmonics of the reference frequency $f_{ref}$ in the phase reference signal 225, while the low pulse modulation frequency of the modulated drive signal 215, which is equal to the modulation frequency $f_{mod}$, results in the phase reference signal 225 having closely spaced reference tones clustered around multiples of reference frequency $f_{ref}$. As a result, the reference tones are closely spaced (e.g., 625 kHz), yet have high power levels.

Figure 5A:
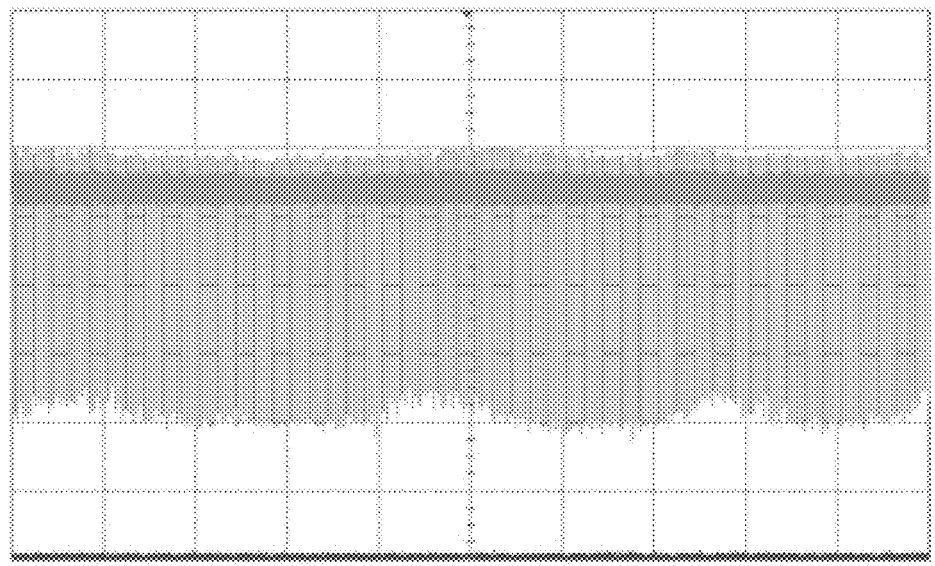
FIGS. 5A and 5B are representative traces showing output power levels of reference tones in a conventionally generated phase reference signal.
Figure 5B:
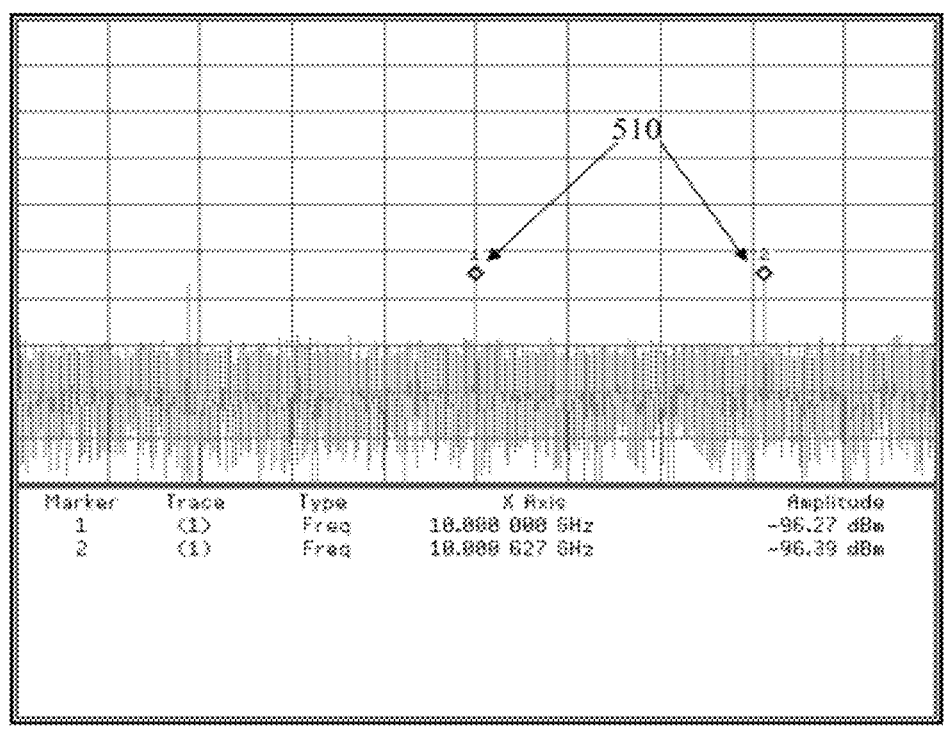
Figure 6A:
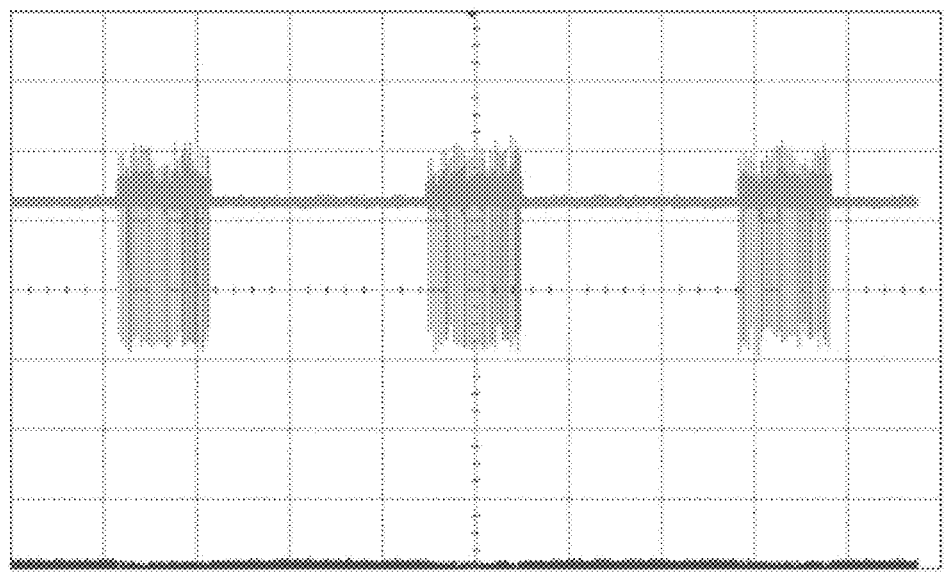
FIGS. 6A and 6B are representative traces showing output power levels of reference tones in a phase reference signal generated according to representative embodiments.
Figure 6B:
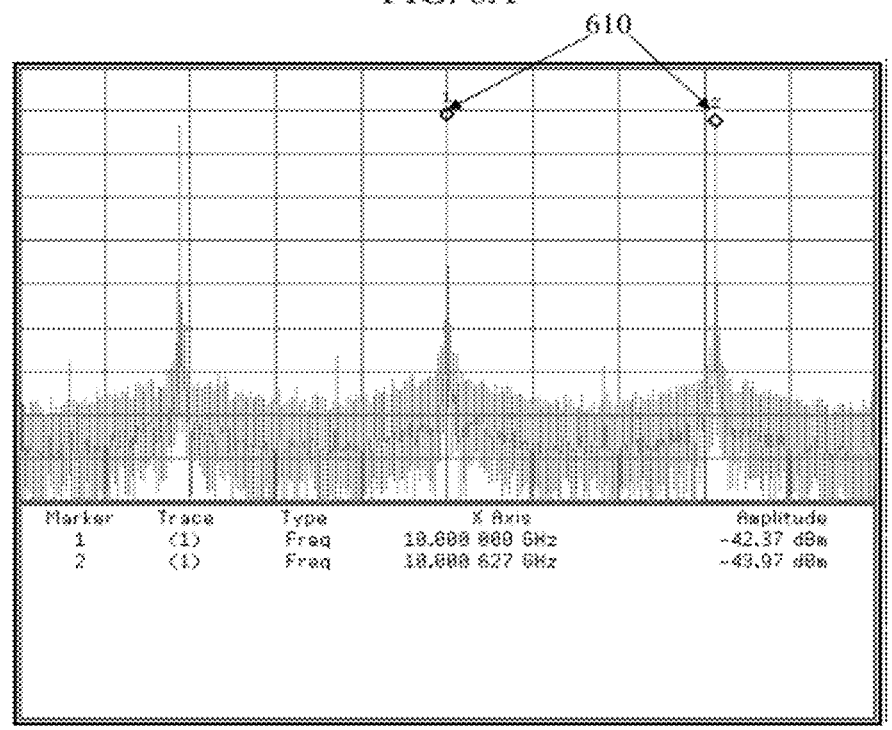

FIGS. 5A and 5B are representative traces showing output power levels of reference tones in a conventionally generated phase reference signal, and FIGS. 6A and 6B are representative traces showing output power levels of reference tones in a phase reference signal generated according to representative embodiments.

FIG. 5A shows a phase reference signal generated using an unmodulated drive signal having a carrier frequency of 625 kHz in the time domain, and FIG. 5B shows the same phase reference signal in the frequency domain, at frequencies near 10 GHz. As shown, high power points 510 of the reference tones are about −97 dBm and are spaced 625 kHz apart. In comparison, FIG. 6A shows a phase reference signal generated using a modulated drive signal, which has a carrier frequency of 1 GHz (reference frequency $f_{ref}$) and is modulated by a rectangular waveform having a frequency of 625 kHz (modulation frequency $f_{mod}$) in the time domain. FIG. 6B shows the same phase reference signal in the frequency domain, at frequencies near 10 GHz. As shown, high power points 610 of the reference tones are about −43 dBm and are spaced 625 kHz apart. For purposes of illustration, both of the frequency domain measurements in FIGS. 5B and 6B are centered at 10 GHz and measured in a span of about 2 MHz to show the frequency components at a high RF frequency, as well as the close-in sidebands. Accordingly, the phase reference signal generated using the modulated drive shows increased power.

Generally speaking, when the modulation frequency $f_{mod}$ is much smaller than the reference frequency $f_{ref}$ (i.e., a secondary comb spacing is much smaller than a primary comb spacing), then modulation of the modulated drive signal 215 at the modulation frequency $f_{mod}$ will have insignificant effect on a phase slope of the phase reference signal generated by the phase reference signal generator 220. For example, when the primary comb spacing is 1 GHz and the secondary comb spacing is 1 MHz, amplitude of the secondary comb falls off at a rate of about 1/modulation frequency $f_{mod}$. Therefore, the modulation component at 1 GHz relative to 1 MHz is 0.001, and convolution will cause a 0.1 percent error in the phase near 1 MHz. Since the error is approximately the same for all components near 1 MHz, the phase slope error will be very small as a result of modulating the modulated drive signal 215.

Figure 7:
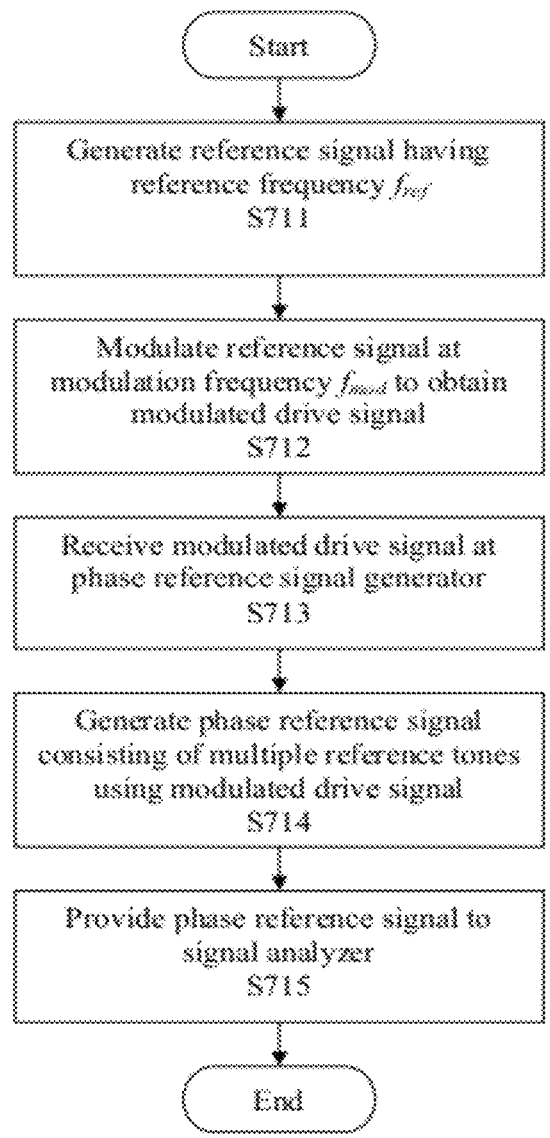
FIG. 7 is a flowchart illustrating a method of providing a phase reference signal, according to a representative embodiment.

FIG. 7 is a flowchart illustrating a method of providing a phase reference signal, according to a representative embodiment.

Referring FIG. 7, a reference signal having a reference frequency $f_{ref}$ is generated in block S711. The reference signal may be generated by a signal generator, such as signal generator 232, discussed above. In block S712, the reference signal is modulated by a modulation signal having a modulation frequency $f_{mod}$ to obtain a modulated drive signal, where the modulation frequency $f_{mod}$ is lower than the reference frequency $f_{ref}$. For example, the modulation frequency $f_{mod}$ may be about one percent or less of the reference frequency $f_{ref}$. The reference signal may be amplitude modulated, for example, and the resulting modulated drive signal has a carrier frequency that is equal to the reference frequency $f_{ref}$, and a square, rectangular or PRBS waveform. Alternatively, the reference signal may be frequency modulated or phase modulated, for example.

In block S713, the modulated drive signal is received at the phase reference signal generator, such as phase reference signal generator 220, discussed above. In response, the phase reference signal generator generates a phase reference signal consisting of multiple reference tones, using the modulated drive signal, in block S714. The reference tones of the phase reference signal have corresponding tone frequencies clustered around multiples of the reference frequency $f_{ref}$. As viewed in the time domain, the reference tones are grouped in pulses corresponding to the modulation frequency $f_{mod}$, and are spaced at intervals within the pulses equal to the reference frequency $f_{ref}$. As viewed in the frequency domain, the reference tones are clustered around main tones corresponding to the reference frequency $f_{ref}$ and integer multiples of the reference frequency $f_{ref}$. The reference tones are spaced at intervals equal to the modulation frequency $f_{mod}$ or integer multiples of the modulation frequency $f_{mod}$, depending on the waveform of the modulation signal. In block S715, the phase reference signal is provided to the signal analyzer, such as signal analyzer 234, discussed above. Accordingly, the signal analyzer is able to perform phase related measurements of response signals from a DUT using the reference tones of the phase reference signal.

In an alternative embodiment, the phase reference signal may be used for calibration of the signal analyzer. For example, the signal analyzer may be an oscilloscope or a spectrum analyzer used to measure relative phase between input signals, in which case reference tones of the phase reference signal may be used as exact phase references to initially calibrate the signal analyzer in preparation for the phase measurements. When the phase reference signal is used for calibration, the signal analyzer would be connected to a calibration unit, as would be apparent to one of ordinary skill in the art, instead of a DUT. Otherwise, the phase reference signal would be generated in the same manner discussed above with reference to FIG. 7.

Figure 8:
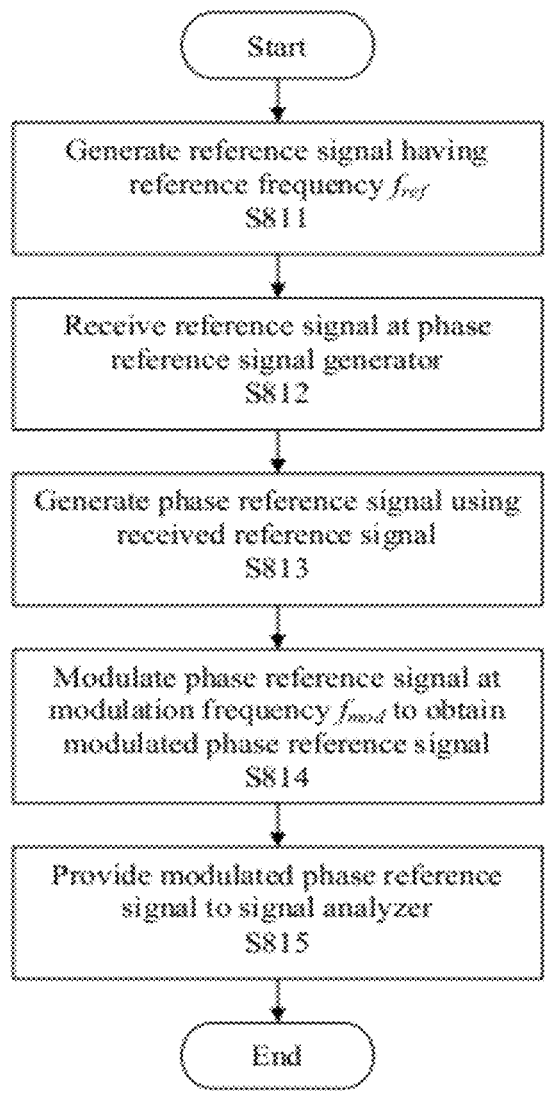
FIG. 8 is a flowchart illustrating a method of providing a phase reference signal, according to another representative embodiment.

FIG. 8 is a flowchart illustrating a method of providing a phase reference signal, according to another representative embodiment, in which the phase reference signal is modulated after being output by the phase reference signal generator. Placing the modulator at this point allows us to use analog amplitude modulation (varying the modulation depth) as opposed to the digital amplitude modulation (turn it on and off) being used at the input of the reference in the FIG. 7 flowchart.

Referring FIG. 8, a reference signal having a reference frequency $f_{ref}$ is generated in block S811. The reference signal may be generated by a signal generator, such as signal generator 232, discussed above. In block S812, the reference signal is received at the phase reference signal generator, such as phase reference signal generator 220, discussed above. In response, the phase reference signal generator generates a phase reference signal using the reference signal as the drive signal in block S813.

In block S814, the phase reference signal output by the reference signal generator is modulated by a modulator, such as modulator 210, using a modulation signal having a modulation frequency $f_{mod}$ to obtain a modulated phase reference signal, where the modulation frequency $f_{mod}$ is lower than the reference frequency $f_{ref}$, as discussed above. Placing the modulator at this point enables use of analog amplitude modulation (varying modulation depth) as opposed to the digital amplitude modulation used at the input of the phase reference signal generator, as in FIG. 7. As a result, reference tones of the modulated phase reference signal have corresponding tone frequencies clustered around multiples of the reference frequency $f_{ref}$. As viewed in the time domain, the reference tones are grouped in pulses corresponding to the modulation frequency $f_{mod}$, and are spaced at intervals within the groups equal to the reference frequency $f_{ref}$. As viewed in the frequency domain, the reference tones are clustered around main tones corresponding to the reference frequency $f_{ref}$ and integer multiples of the reference frequency $f_{ref}$. The reference tones are spaced at intervals from one another equal to the modulation frequency $f_{mod}$ or integer multiples of the modulation frequency $f_{mod}$, depending on the waveform of the modulation signal.

In block S815, the modulated phase reference signal is provided to the signal analyzer, such as signal analyzer 234, discussed above. Accordingly, the signal analyzer is able to perform phase related measurements of response signals from a DUT using the reference tones of the phase reference signal. In an alternative embodiment, the phase reference signal may be used to calibrate the signal analyzers, as discussed above.

By modulating the drive signal input to a phase reference signal generator, the phase reference signal generator will provide high-power reference tones spaced closer and having higher power than conventional reference tones. The higher power results in faster and more accurate measurements of response signals from a DUT. The spread of the reference tones is controlled by selecting the modulation frequency $f_{mod}$, modulation type (e.g., amplitude, frequency or phase), and the modulation waveform (e.g., square, rectangular or PRBS). The phase reference signal may be applied for measuring IMD, memory effects and harmonic distortion, performing mixer spurious testing, and the like. Also, the phase reference signal may be applied for calibrating various devices, such as oscilloscopes, spectrum analyzers, broadband receivers, and the like. For example, the phase reference signal may be used for performing receiver IF flatness calibration.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. A method of providing a phase reference signal, comprising:
   generating a reference signal having a reference frequency;
   modulating the reference signal at a modulation frequency lower than the reference frequency to obtain a modulated drive signal;
   receiving the modulated drive signal at a phase reference signal generator; and
   generating the phase reference signal based on the modulated drive signal, the phase reference signal comprising a plurality of reference tones having corresponding tone frequencies clustered around multiples of the reference frequency, wherein a spacing between adjacent tones of the plurality of reference tones is the same as the modulation frequency or an integer multiple of the modulation frequency.

2. The method of claim 1, wherein modulating the reference signal comprises amplitude modulating the reference signal to obtain an amplitude modulated drive signal.

3. The method of claim 2, wherein the amplitude modulated drive signal comprises a reference signal with at least one of a square waveform modulation envelope, a rectangular waveform modulation envelope, and a pseudo random binary sequence (PRBS) waveform modulation envelope.

4. The method of claim 1, wherein modulating the reference signal comprises frequency modulating the reference signal to obtain a frequency modulated drive signal.

5. The method of claim 4, wherein the frequency modulated drive signal comprises a pseudo random binary sequence (PRBS) waveform.

6. The method of claim 1, wherein modulating the reference signal comprises phase modulating the reference signal to obtain a phase modulated drive signal.

7. The method of claim 6, wherein the reference signal is binary phase shift key (BPSK) modulated.

8. The method of claim 1, further comprising:
   performing calibration of a device using the phase reference signal, enabling phase related measurements by the device of response signals from a device under test.

9. The method of claim 1, further comprising:
   performing phase related measurements of response signals from a device under test using the phase reference signals.

10. The method of claim 1, wherein the reference frequency is at least 100 MHz, and the modulation frequency is less than 10 MHz.

11. The method of claim 1, wherein the reference frequency is at least 100 MHz, and the modulation frequency is less than 1 MHz.

12. The method of claim 1, wherein a modulation component at the reference frequency relative to the modulation frequency is less than 0.01.

13. A system for determining a nonlinear characteristic of a device under test (DUT), the system comprising:
   a signal generator configured to generate a radio frequency (RF) drive signal, the RF drive signal having a carrier frequency and being modulated at a modulation frequency that is lower than the carrier frequency;
   a phase reference signal generator configured to receive the modulated RF drive signal from the signal generator and to output a plurality of tones having corresponding tone frequencies clustered around multiples of the carrier frequency, wherein differences between tone frequencies of adjacent tones are the same as the modulation frequency or an integer multiple of the modulation frequency; and
   a signal analyzer configured to receive a response signal from the DUT in response to a stimulus signal, to calculate a phase difference between selected frequencies of the response signal using at least one tone of the plurality of tones as a phase reference, and to determine the nonlinear characteristic of the DUT based on the calculated phase difference.

14. The system of claim 13, wherein the signal analyzer comprises a nonlinear vector network analyzer.

15. The system of claim 13, wherein determining the nonlinear characteristic of the DUT includes at least one of measuring intermodulation distortion, measuring memory effects, measuring harmonic distortion, identifying spurious signals, and performing IF calibration of the signal analyzer.

16. The system of claim 13, wherein the stimulus signal comprises a multi-tone stimulus signal having at least two tones localized around a center frequency of the stimulus signal, and
   wherein the network analyzer calculates the phase difference between the two tones of the multi-tone stimulus signal.

17. A method of providing a phase reference signal, comprising:
   generating a reference signal having a reference frequency;
   receiving the reference signal at a phase reference signal generator;
   generating the phase reference signal using the reference signal as a drive signal; and
   modulating the phase reference signal at a modulation frequency lower than the reference frequency to obtain a modulated phase reference signal, wherein the modulated phase reference signal comprises a plurality of reference tones having corresponding tone frequencies clustered around multiples of the reference frequency, and wherein a spacing between adjacent tones of the plurality of reference tones is the same as the modulation frequency or an integer multiple of the modulation frequency.

18. The method of claim 17 wherein modulating the phase reference signal comprises analog amplitude modulation.

19. The method of claim 17, further comprising:
performing calibration of a device using the modulated phase reference signal, enabling phase related measurements by the device of response signals from a device under test.

20. The method of claim 17, further comprising:
performing phase related measurements of response signals from a device under test using the modulated phase reference signals.

\* \* \* \* \*